G. L. FREETO.
ACETYLENE GENERATOR.
APPLICATION FILED DEC. 22, 1913.
1,117,995.
Patented Nov. 24, 1914.
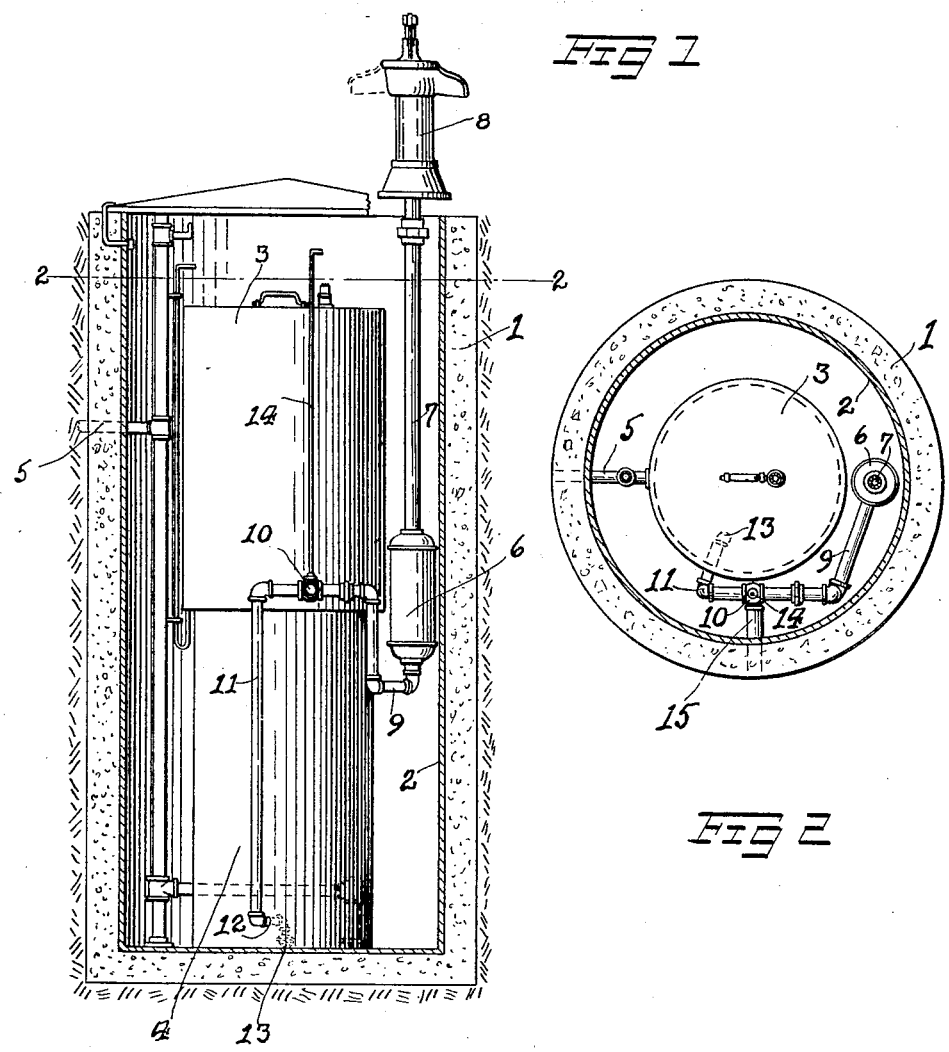
GEORGE L. FREETO
INVENTOR.
WITNESSES:
Leo Matthews
Sarah Schwartz
BY Fred D. Silloway
ATTORNEY

UNITED STATES PATENT OFFICE.

GEORGE L. FREETO, OF MECHANICSBURG, ILLINOIS.

ACETYLENE-GENERATOR.

1,117,995.  Specification of Letters Patent.  Patented Nov. 24, 1914.

Application filed December 22, 1913. Serial No. 808,294.

*To all whom it may concern:*

Be it known that I, GEORGE L. FREETO, a citizen of the United States, residing at Mechanicsburg, in the county of Sangamon and State of Illinois, have invented new and useful Improvements in Acetylene-Generators, of which the following is a specification.

My invention relates to improvements in acetylene generators of the type designed as pit generators, which are sunk into the ground.

The object of the present invention is to provide improved means for supplying water to the water tanks of such a device, and to so arrange the water supply means that the sludge or residuum which collects in the water tank may be removed therefrom by the same device.

With the above and other objects in view, my invention comprises the novel construction and arrangement of the several elements, which will be hereinafter described, illustrated in the accompanying drawings, and pointed out in the appended claim.

The preferred embodiment of my invention is illustrated in the accompanying drawings, to which reference will be had, like characters of reference referring to like or corresponding parts throughout the several views.

In the drawings:—Figure 1 is a vertical sectional view through the generator pit, showing the generator therein and the pump connections thereto. Fig. 2 is a sectional view through the generator pit, taken on line 2—2 of Fig. 1.

Referring to the drawings, numeral 1 designates the generator pit, which comprises a cylindrical hole in the ground, preferably walled with concrete, into which the outer tank 2 is adapted to fit.

Numeral 3 designates the generator in general, which generator is positioned within outer tank 2, and which comprises a water tank 4 at the lower end thereof, a house pipe 5 providing escape for the gas generated in the generator.

It will be understood that in generators of this type, water is carried in tank 4, into which the carbid carried in the upper portion of the generator is fed, thus producing the acetylene gas. It has hitherto been found inconvenient to introduce water into the water tank 4, or into the outer tank 2, wherein water is provided as a seal to prevent the gas from escaping between the upper and lower portions of the generator. It has been found particularly laborious to remove the residuum from the tank 4, after the carbid has been exhausted, in generators of prior invention. In my present invention, these inconveniences have been minimized by the introduction of a pump-piping system of novel construction.

A pump cylinder 6, of any suitable design, is anchored in the outer tank 2 between the generator 3 and the wall of the outer tank, which cylinder is provided with a pump stock 7, and a removable pump 8 of any suitable type is arranged for attachment thereto just above the top of tank 2. Cylinder 6 is connected by a pipe line 9 to a three-way valve 10, which valve is adapted to make connection with a water supply pipe 15 leading to a convenient well or cistern, or with pipe line 11, which has access to the lower portion of the water tank 4. Pipe line 11 passes through the wall of tank 4, at opening 12, and is provided with an ordinary foot valve 13 positioned adjacent the bottom of the water tank. The actuating rod 14 by which the three-way valve is operated extends upward within reach of an attendant when the lid of the tank 2 is removed. In bringing the pumping mechanism into operation, the lid will be removed from the top of the outer tank. The bell of the generator will then be removed, also the carbid holder and feeding mechanism contained therein, and the pump 8 attached to pump stock 7.

It will be seen that by actuating the valve rod 14 to the position in which connection is opened between the pump cylinder and the cistern pipe 15, that the pump may be brought into service, and water pumped directly from the cistern. When this operation is being performed, the exhaust spout from the pump will be turned to discharge water into the water tank 4, or into the outer tank 2, as desired, the spout being turned to the position shown in dotted lines in Fig. 1. When it is desired to pump the residuum from tank 4, the valve rod 14 will be actuated to make connection betwen the pipe line 11 and the pump cylinder, whereupon the pump 8 may be turned to the position shown in full lines in Fig. 1, and the residuum pumped from tank 4, and discharged without the generator pit.

From the foregoing description, it will be readily understood that my invention provides improved means for supplying water to the water tanks of pit type acetylene generators, and provides a novel arrangement of pump-piping, whereby the residuum may be removed from the water tank with a minimum amount of labor.

While I have herein described and illustrated the preferred embodiment of my invention, I do not wish to be limited strictly thereto, except for such limitations as the claim may import, as it is obvious that slight changes in the relation and construction of the several elements may be made without departing from the broad spirit of my invention.

Having thus described my invention, what I claim is:—

The combination with an acetylene generator comprising a water tank into which carbid is fed to produce acetylene gas, of a pump cylinder positioned within the outer tank thereof, a pump stock leading from the pump cylinder out of the outer tank, a removable pump adapted for connection to said pump stock, a pipe line from said pump cylinder to a three-way valve, a three-way valve, a pipe line from said three-way valve to the inside of the water tank of said generator, a pipe line from said three-way valve to a well or cistern, and means for completing pumping connections between the pump cylinder and either of the other two pipe lines, substantially as described.

GEORGE L. FREETO.

Witnesses:
J. T. FULLENWIDER,
WM. T. FULLENWIDER.

Copies of this patent may be obtained for five cents each, by addressing the "Commissioner of Patents, Washington, D. C."